3,764,480
MEASURING SURFACE BACTERIA

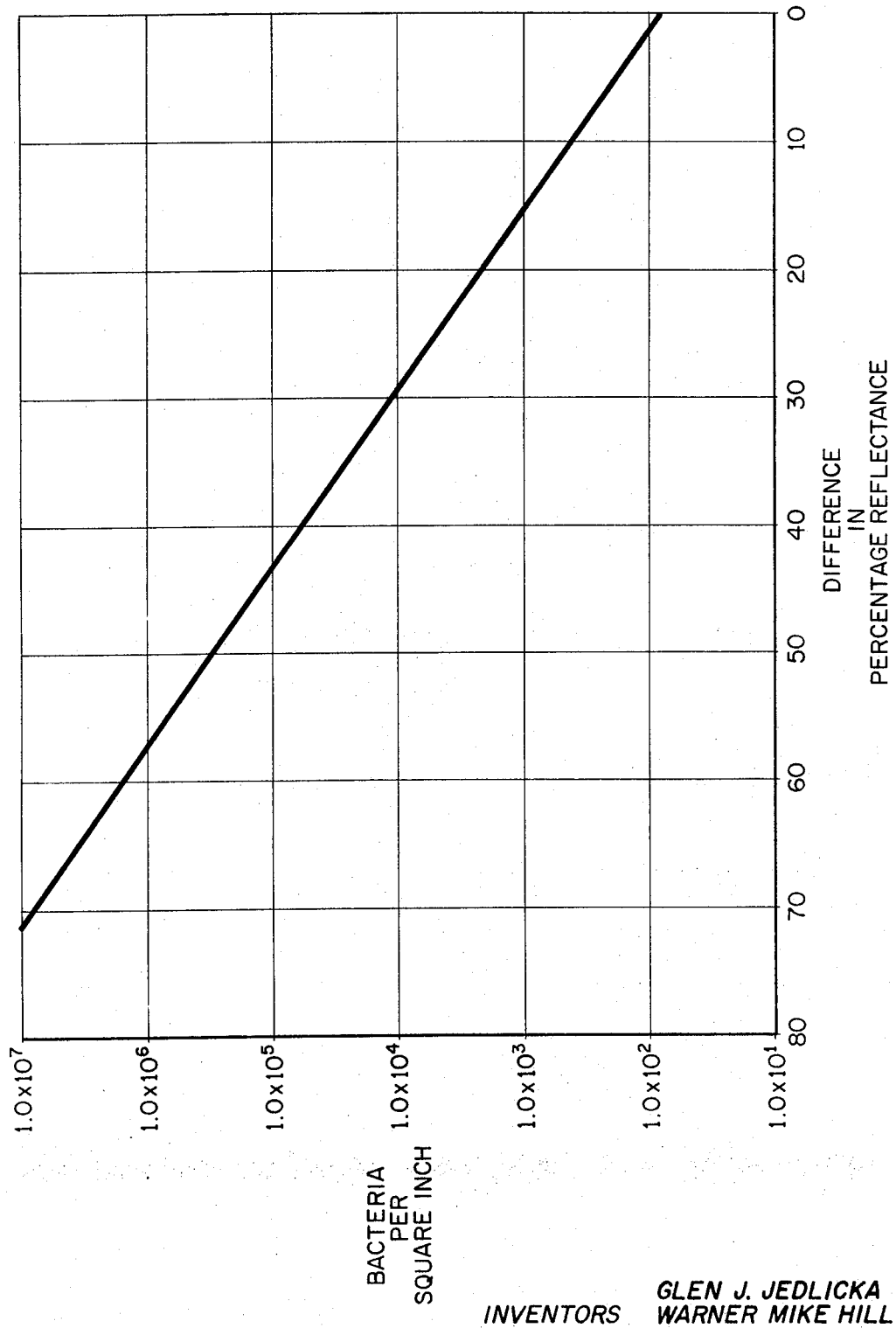

Glen J. Jedlicka, Riverside, Warner Mike Hill, Downers Grove, and Joseph G. Heck, Lombard, Ill., assignors to Armour and Company, Phoenix, Ariz.
Filed Aug. 25, 1971, Ser. No. 174,816
Int. Cl. C12k 1/04
U.S. Cl. 195—103.5 R    11 Claims

ABSTRACT OF THE DISCLOSURE

The surface of a sterilized culture medium containing 2,3,5 - triphenyltetrazolium chloride and titanium dioxide is pressed against a surface to be investigated to pick up bacterial present thereon, the medium is then incubated, and the reflectivity of the medium is then measured to provide a surface bacterial count.

---

The present invention relates in general to a novel method and culture medium for making surface bacterial counts, and it relates more particularly to a new and improved method and culture medium which is relatively easy to use, which may be used where bacteria levels are high, and which may be used for making bacteria counts on animal carcasses as well as on equipment surfaces and the like.

Present methodology for making bacteria counts on animal carcasses and equipment surfaces is both cumbersome and time-consuming and requires a substantial degree of skill on the part of the person performing the test. Perhaps the most commonly used method is the swab rinse technique wherein a swab is rubbed over the surface area to be investigated, then rinsed in a vial of sterile water, and a culture made from the water. After incubation, the culture is visually examined and the number of bacteria colonies counted. Where the bacteria count is relatively high, as for example, one-thousand or more bacteria per square inch, it is extremely tedious and difficult, if not impossible, to accurately count the number of colonies. Rinse tests are also known, but they also require a visual count of the bacteria colonies, and, in addition, are not adaptable for use on large surfaces such as animal carcasses and the like. Agar contact tests are also known, but like the swab-rinse and rinse tests are dependent on visual examination of the culture and counting of the bacterial colonies.

There is, however, a need for a simple test which can be made by relatively unskilled persons for determining surface bacteria counts or other determinations to insure that bacteria levels on food products and associated equipment are not so great as to constitute a health hazard. The results of such tests should be substantially independent of the person making the test and should, moreover, be reproducible.

Therefore, an object of the present invention is to provide a new and improved method for making surface bacteria tests.

Another object of this invention is to provide a new and improved culture medium.

A further object of this invention is to provide a surface bacteria test which does not require visual examination and counting of bacteria colonies.

Briefly, the above and further objects may be realized in accordance with the present invention by providing a sterilized culture medium which is substantially white in color and which changes color in the presence of growing bacteria; inoculating the surface of the medium by, for example, contacting it against the surface to be investigated, incubating the inoculated medium for a predetermined time, measuring the reflectance of the surface of the incubated medium; and comparing such reflectance to that of the medium prior to incubation. The difference or change in reflectance is directly related to the bacteria count of the surface area thus investigated.

Further objects and advantages and a better understanding of the invention may be had from the following detailed description taken in connection with the accompanying drawing.

In accordance with the teachings of the present invention a culture medium consisting of a sterile solution of water, brain heart infusion agar, titanium dioxide and 2,3,5-triphenyltetrazolium chloride is prepared and poured into Rodac plates to completely fill the plates and provide a convex meniscus extending over the upper side edges of the plates after setting. Titanium dioxide is used to provide a white, opaque culture medium as contrasted to the usual translucent, light color which obtains in the absence of titanium dioxide. Unless this culture medium is standardized as to reflectance characteristics, the reflectance of the culture medium in each plate should be measured and recorded before incubation. This can be done using any standard reflectometer such as model D40 manufactured by Hunter Associates Laboratory Inc., Fairfax, Va.

To perform a surface bacteria test, the meniscus surface of the culture medium in one of the plates is pressed directly against the surface to be investigated whereby bacteria present thereon are transferred to the surface of the culture medium. The culture medium is then incubated for a predetermined period of time of say, forty-eight hours. Bacteria growth in the culture medium reduces the 2,3,5 - triphenyltetrazolium chloride which turns red in the presence of growing bacteria. Each colony of bacteria thus appears as a red spot on the white background of the culture medium, whereby the reflectance of the medium changes. The surface reflectivity or reflectance of the incubated culture medium is again measured and compared with the reflectance thereof measured prior to incubation. We have found that the change in reflectance is directly related to the bacterial count determined by visual counting of the colonies. Unlike the visual method of actually counting the colonies, however, the reflectance can be easily and quickly measured using a standard reflectometer. Moreover, the measurement made with a reflectometer is repeatable and independent of the operator, which is not the case when a bacteria count is made by visually counting the colonies. If desired, such, for example, as where surface bacteria standards have already been established in terms of bacteria counts, i.e., bacteria colonies per square inch, the standards have already been established in terms of bacteria count using the graph shown on the accompanying drawing. In such a case, the incubation period should be the same as the standard adopted for making bacteria counts, which period is ordinarily about forthy-eight hours.

The culture medium of the present invention may be prepared by mixing together the following ingredients:

| | Grams |
|---|---|
| Infusion of calf brains | 200 |
| Infusion of beef hearts | 250 |
| Proteose peptone | 10 |
| Dextrose | 2 |
| Sodium chloride | 5 |
| Disodium phosphate | 2.5 |
| Agar | 15 |
| Titanium dioxide | 10 |

Water, 1 liter.

The above mixture is then heat sterilized and 10 milliliters of a pre-sterilized 1% solution of 2,3,5-triphenyltetrazolium chloride is mixed therewith.

The ingredients as listed above from the infusion of calf brains through agar is commonly known as "brain-heart infusion agar" and is commercially available. Sixteen milliliters of the solution is then poured into each of a number of Falcon #1034 Rodac plates to completely fill the plates.

When measuring the reflectance of the culture medium, a reflectometer, such as referred to hereinabove, may be used. When making the second reflectance measurement after incubation, such reflectometer can be initially set to read zero at the original reflectance value whereby the instrument directly indicates the change in the percentage reflectance of the culture medium after incubation.

As noted hereinabove, the incubation time used must be standardized to provide usable results even though such time is not critical. It has been found, however, that an incubation period of forty-eight hours is satisfactory and provides the advantage that the reflectance readings can be converted to presently established bacteria counts per square inch standards using standard curves for the particular types of bacteria present.

The use of an opaque, white culture medium to provide a high reflectance background sharply contrasting with the red areas denoting the bacteria colonies enables the use of a change in reflectance measurement which can be quickly and easily made with a reflectometer. Titanium dioxide may be used for this purpose since it is readily available and substantially inert so as not to affect bacteria growth in the culture medium.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A method of measuring the amount of viable bacteria present on a surface, comprising the steps of contacting said surface with a culture medium and removing the medium from said surface thereby inoculating said medium with bacteria from said surface, measuring the reflectance of said medium to obtain a first value which corresponds to the amount of light reflected prior to incubation, incubating said medium for a time sufficient to permit substantial growth of said bacteria, again measuring the reflectance of said medium to obtain a second value which corresponds to the amount of light reflected after incubation, and determining the difference between said second value and said first value, said difference being taken as a measure of the amount of bacteria present on said surface.

2. A method according to claim 1 wherein said culture medium includes 2,3,5-triphenyltetrazolium chloride.

3. A method according to claim 2 wherein said culture medium is opaque and white in color.

4. A method according to claim 2 wherein said culture medium includes titanium dioxide.

5. A method according to claim 1 wherein said culture medium comprises:
a mixture of titanium dioxide, 2,3,5-triphenyltetrazolium chloride and brain-heart infusion agar, and
said inoculating step is carried out by pressing the surface of said culture medium against the surface to be tested.

6. A method according to claim 5 wherein said culture medium is provided in an open top container and has a convex meniscus extending above the upper sides of said container.

7. A method according to claim 6 wherein said container is a Rodac plate.

8. In a method for measuring the amount of viable bacteria present on a surface, the steps of transferring bacteria from said surface to a culture medium to inoculate said medium with said bacteria, measuring the reflectance of said medium, and incubating said medium for a time sufficient to permit substantial growth of said bacteria contained therein, and again measuring reflectance of said medium to obtain through the relationship of said reflectances before and after incubation a measure of the amount of said viable bacteria on said surface.

9. A method according to claim 8 wherein said reflectance measurements are made using a reflectometer type of instrument.

10. A method as set forth in claim 8 in which said medium is opaque and white.

11. A method as set forth in claim 10 in which said medium contains titanium dioxide.

References Cited

UNITED STATES PATENTS 3,197,384   7/1965   Goldman ........ 195—103.5 R

OTHER REFERENCES

Developments in Industrial Microbiology; L. S. Gall, W. Clayton and C. T. Wallace, Garamond & Pridemark Press (1970), pp. 460–469.

LIONEL M. SHAPIRO, Primary Examiner

R. J. WARDEN, Assistant Examiner